United States Patent [19]
Franz et al.

[11] 3,874,642
[45] Apr. 1, 1975

[54] SLURRY UNLOADING OF BULK ALKALINE EARTH METAL CARBONATES

[76] Inventors: Arvel O. Franz; John Lawrence Gray, both of c/o Chemical Products Corporation, Cartersville, Ga. 30120

[22] Filed: Mar. 4, 1974

[21] Appl. No.: 447,882

Related U.S. Application Data

[60] Division of Ser. No. 141,971, May 10, 1971, which is a continuation-in-part of Ser. No. 625,633, May 1, 1968, Pat. No. 3,533,821.

[52] U.S. Cl.................................. 259/147, 222/195
[51] Int. Cl.............................................. B28c 5/06
[58] Field of Search ........... 259/151, 147, 148, 146, 259/145; 222/195; 302/59; 106/306; 252/313

[56] References Cited
UNITED STATES PATENTS

| | | | |
|---|---|---|---|
| 2,188,663 | 1/1940 | McClure | 106/306 |
| 2,345,311 | 3/1944 | Wilson | 106/306 |
| 3,137,482 | 6/1964 | Hackley | 259/151 |
| 3,236,504 | 2/1966 | Galer | 259/147 |
| 3,251,583 | 5/1966 | Mason | 259/151 |

*Primary Examiner*—Robert W. Jenkins
*Attorney, Agent, or Firm*—William J. Mason

[57] ABSTRACT

A method for unloading alkali earth metal carbonates, in slurry form, from bulk storage is described. A specially formulated alkali earth metal carbonate composition containing an ultra-hydrophilic dispersant is also described.

9 Claims, 2 Drawing Figures

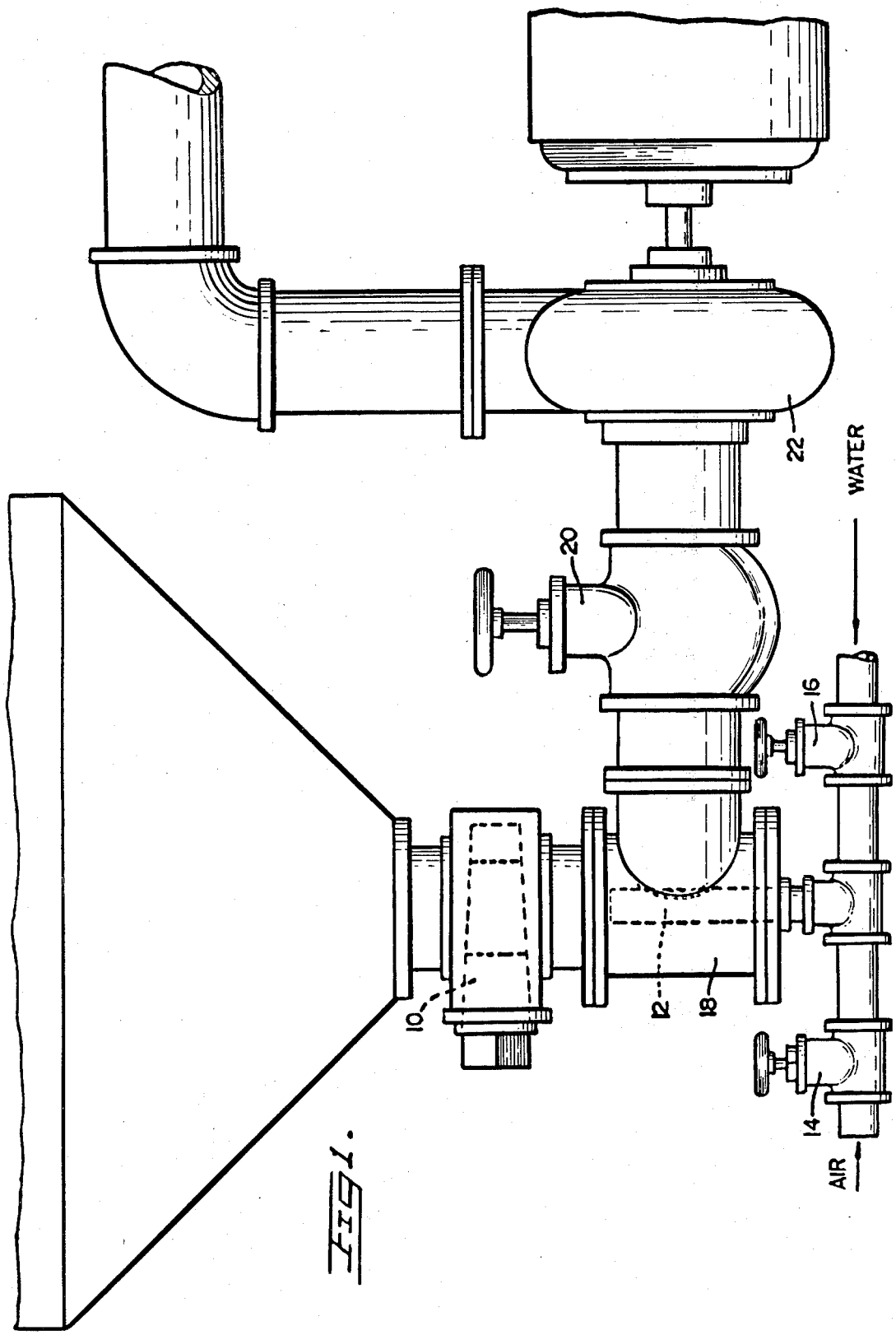

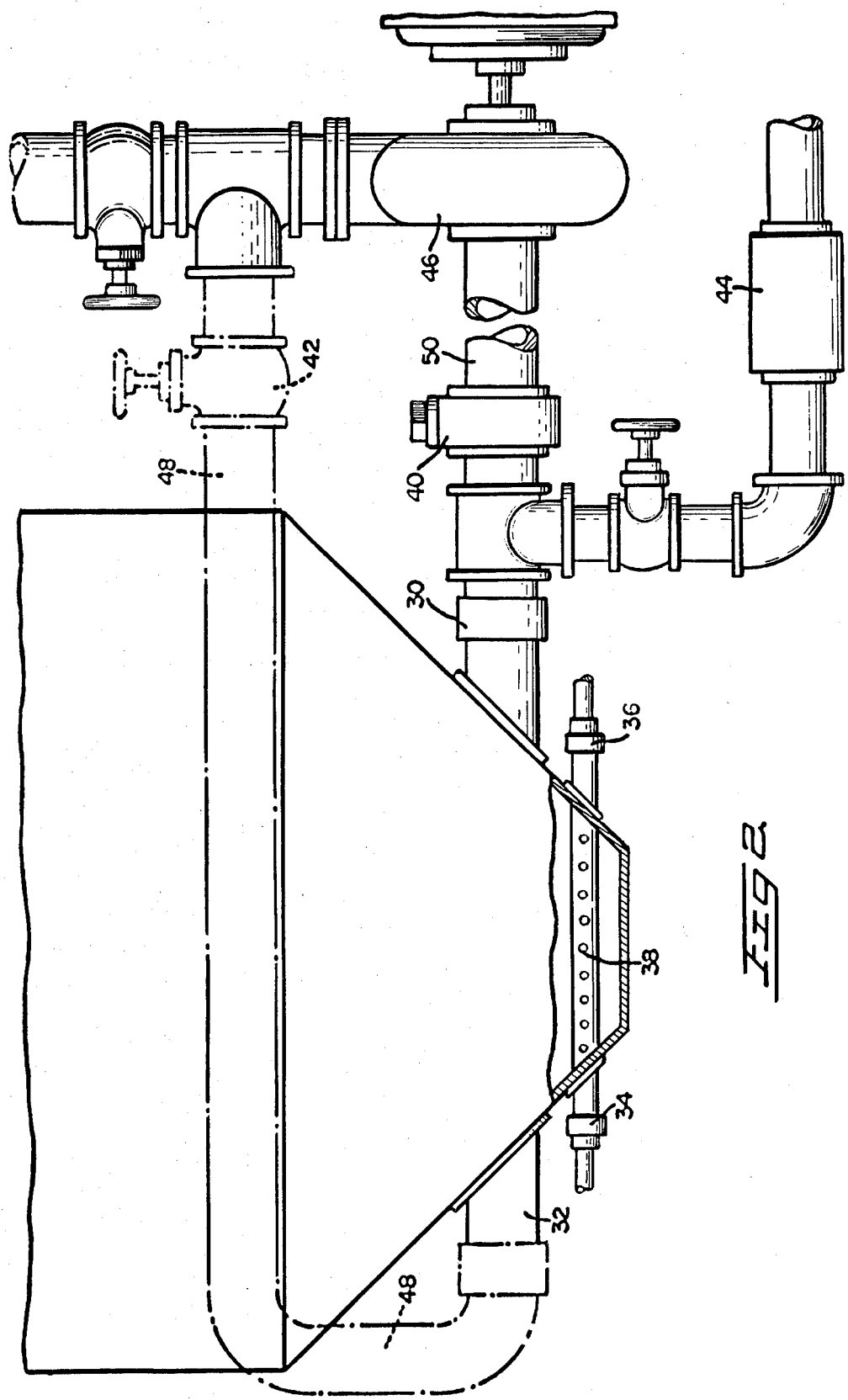

SLURRY UNLOADING OF BULK ALKALINE EARTH METAL CARBONATES

Benefit of Prior Application

This application is a division of application Ser. No. 141,971, filed May 10, 1971 which in turn is a continuation-in-part of application Ser. No. 625,633 filed May 1, 1968, now U.S. Pat. No. 3,533,821.

Alkaline earth metal carbonates which for the purpose of this application are defined as the carbonates of barium, calcium and strontium normally prepared, are unsuitable for standard bulk handling and storage methods. They are fine powders consisting of strongly aggregated tiny crystallites. The powder has a high angle of repose and problems of feeding it or removing it from hoppers or bins are almost insurmountable except by very costly devices. Attempts to grow larger crystals, or crystals which are inherently free-flowing, have met with some success but, unfortunately, this can only be accomplished at the expense of "reactivity" and the increase of dustiness.

These alkaline earth metal carbonates are important chemicals of commerce. Barium carbonate, for example, is widely used as an ingredient of glass, enamel frits, in the treatment of brines for removal of sulfates, and in the ceramic industry for the control of "scum", as well as many other uses. The major users of these materials individually use many carloads per year and the problem of unloading, storing and dispensing these materials is an important one.

Currently, in order to handle barium carbonate in bulk containers, it is necessary to calcine the carbonate, i.e., heat it to temperatures in excess of 1400°F, at which temperature crystal growth occurs and the material shrinks to a hard, almost rock-like form. This material is then ground (e.g., in a hammer mill) and sieved or screened into acceptable size range. At best, the resulting product is a compromise. The process is expensive. The fines produced in grinding are dusty in the extreme, the coarse material undesirably refractory for many end uses. In addition, in wet systems or, in general, for chemical uses, the reactivity of the product has been drastically reduced, even to the point where even dissolution in acid is accomplished with difficulty.

U.S. Pat. No. 3,222,036 describes a method and apparatus useful for the production of barium carbonate dispersions. The techniques described in this patent are particularly useful in the handling of specially formulated barium carbonate materials such as those described in U.S. Pat. No. 3,322,683. This latter patent details a method of producing and metering a high solids content slurry of a very reactive form particularly useful for control of scum in ceramic products, and the method has met with considerable success. Accordingly, it is presently possible to ship to the users of barium carbonate, either regular barium carbonate or the specially formulated material permitting the formation of the slurries at the point of ultimate use. This, of course, requires special equipment at the site of use for mixing the solid materials which may not always be practical and is often undesirable. An alternative is the shipment of barium carbonate in slurry form in tank cars. With straight barium carbonate, excessive quantities of water must be employed in order to obtain a slurry, and the resulting slurry tends to settle out during shipment rendering recovery of the slurry from the shipping container quite difficult. The specially formulated barium carbonate material can be shipped as slurries of very high solids content, e.g. 75% without significant danger of the solids settling out of the slurry. While such operation is feasible, the freight costs of shipping of even the relatively small quantity of water involved makes this method competitively unattractive at points distant from the point of manufacture.

Attempts have been made to ship barium carbonate and/or dry premixes of these specially formulated barium carbonate materials in tank cars with the slurry being produced in the tank cars at the point of use. As will be shown subsequently herein, this technique is quite unsatisfactory; recovery of the solids from the tank cars is quite difficult and extremely non-uniform slurries are obtained.

It has now been found that by further modification of the specially formulated barium carbonate materials of U.S. Pat. No. 3,222,683, shipping of such materials in suitable containers, such as tank cars, and following a particular sequence of steps, barium carbonate slurries of uniform characteristics may be produced at the site of use in a form suitable for use without the necessity for special handling equipment at the site and without necessity for shipping water. Other alkaline earth metal carbonate mixtures can be prepared which can be slurried in the same manner.

In accordance with the present invention, an autogenously dispersible alkaline earth metal carbonate composition is contained in a bulk container having a generally frustro-conical bottom and is removed therefrom as a generally uniform slurry of high solids content. Removal is effected by the introduction of an aqueous liquid, generally water, into said autogenously dispersible alkaline earth metal carbonate composition, introducing compressed gas into said alkaline earth metal carbonate composition at the conclusion of said aqueous liquid introduction to effect agitation and mixing of said alkaline earth metal carbonate composition and said aqueous liquid, and discharging the resulting slurry from said bulk container.

An autogenously dispersible alkaline earth metal carbonate composition for the purposes of the present invention comprises the product of mixing, in the presence of water, an alkaline earth metal carbonate and an ultra-hydrophilic dispersant and drying of the resultant mixture. An ultra-hydrophilic dispersant is defined herein as a hydrophilic dispersant which when added to water, produces a true solution in water (as distinguished from a colloidal solution), which can be dried only with difficulty and which, when dried, is definitely hygroscopic. Further, the ultra-hydrophilic dispersant exhibits a lower interfacial tension with water (as indicated by the rapid spead of a droplet of water when placed on a dried film of such a material) and satisfies the subsequently described empirical test for an autogenously dispersible barium carbonate composition. Typical ultra-hydrophilic dispersants are Calgon (glassy sodium hexametaphosphate), Dequest 2006 (the sodium salt of a phosphorous-containing acid free of oxygen bridging), specifically a 40% solution of pentasodium amino trio (methylphosphonate) and Nalco No. 2162, as well as mixtures of these which seem to exhibit synergistic behavior.

It is preferred to use quantities of the ultra-hydrophilic dispersant which are determined by experiment to be somewhat more than enough to produce a minimum viscosity of a 75% slurry. For the examples cited, this is in the range of 0.15 to 0.25% (dry weight basis) of the individual dispersants. In synergistic combinations, however, as low as 0.08% (dry weight basis) may be effective, e.g., 0.02% Calgon, 0.06% (dry weight basis) Dequest 2006.

An empirical test for determining whether any particular dispersant is an ultra-hydrophilic dispersant and for determining whether barium carbonate compositions with that dispersant are autogenously dispersible is as follows. Barium carbonate is deflocculated in water with an effective amount of the dispersant (e.g., 0.15% dry weight as a 40% water solution of the dispersant) with vigorous agitation. Barium carbonate filter cake containing about 60% solids is suitable without further water addition. The resulting slurry is dried (e.g., in a hot-air dryer) and the resulting lumpy product ground (e.g., by passage through a hammer mill). Twenty-five grams of the product are placed on a watch glass and the pile so formed is lightly compressed. To this material is added, drop-wise, 8.5 milliliters of water over a period of about three minutes with all of the water being added at one point. If the dispersant meets the requirements of the present invention, the water will be rapidly imbibed and the mass will begin to demonstrate fluidity when about 6 milliliters of water have been added. At the conclusion of the water addition, very slight movement of the watch glass should provide sufficient agitation to reduce the entire mass to a thin fluid.

The introduction of the aqueous liquid into the autogenously dispersible alkaline earth metal carbonate composition is effected at a point below the major portion of the mass, preferably near the bottom of the bulk container. The amount of liquid added generally corresponds to that necessary to provide a slurry of desired solids content for ultimate use. The rate of liquid addition is maintained to permit the alkaline earth metal carbonate composition to imbibe the water, e.g., at a rate such that the carbonate material does not noticeably rise in the container, but with the water being absorbed in the material. If the water addition is too rapid, the water will either float the carbonate without wetting the mass, or will follow a path of least resistance to rise upward to the top of the mass without wetting the major portion of the mass. Either result is undesirable since it interferes with, and indeed prevents, proper absorption and wetting of the carbonate mass. At the conclusion of the liquid addition, compressed gas is introduced into the bulk container from the bottom of the container.

For a plurality of reasons, it is necessary that the major liquid addition be completed before introduction of the compressed gas. If gas is introduced before the bulk of the material is wetted, the gas will cause liquid to surround masses of the dry material, preventing proper wetting of the material. Further, the combination of the gas stream with less than the minimum amount of wetting liquid will produce paths of least resistance through the material which will be followed by the gas creating channels through which both the gas and the liquid will pass freely, thereby again preventing wetting and proper agitation of the bulk of the material.

It is possible, in accordance with the present invention, to introduce less than the desired amount of liquid following which the compressed gas is introduced into the mixture and subsequent dilution of the resulting high solids slurry. In this instance, however, the liquid initially introduced must be at least the minimum to provide a fluid slurry. Typically, at about 80% solids, a slurry at the barium carbonate composition begins to exhibit loss of fluidity and at 85% solids is insufficiently fluid for the preferred practices of the present invention. Thus, in the production of a barium carbonate slurry of 60% solids, all of the liquid may be added initially following which compressed gas is introduced into the mixture. Alternatively, sufficient water is introduced to provide, for example, a 75% solids slurry, compressed gas is then introduced until a generally uniform slurry is obtained, and additional water is then added to reduce the solids content of the slurry to the desired 60% level. Some type of agitation, such as continuation of gas addition, should be employed during the dilution step to insure uniformity of the slurry. Corresponding values for the other alkaline earth metal carbonates can be easily determined by a person skilled in the art.

In the preferred practices of the present invention, the aqueous liquid is water and the compressed gas is air. In referring to compressed gas, it is intended to include any non-reactive gas under pressure and may be introduced from pressurized tanks or may be pumped directly into the bulk container.

The slurry may be removed from the bulk container by gravity or may be pumped therefrom, preferably by means of a positive displacement type of pump. There is no particular criticality in this regard.

FIG. 1 illustrates a bulk container useful with the present invention. In the corresponding apparatus employed for tests described in the examples herein, the container was 18 inches square and 6 feet on the straight side. The bottom was a frustrum of a right pyramid with the sides forming an angle of 45° with the vertical. The bottom was equipped with a 1½ IPS plug cock having associated therewith as an air inlet and a water inlet of a ¼ inch iron pipe. The flow of air and water were separately controlled by valves. Surrounding the air-water inlet was a 1½ IPS Tee. The side outlet of this Tee was connected to a valve which was, in turn, connected to the suction side of an unloading pump.

EXAMPLE I

To illustrate the preferred method of operation, 600 lb. of barium carbonate in the form of undried filter cake at 60% solids content was deflocculated with 0.15% (0.9 lb.) dry weight as a 40% water solution of Dequest 2006 (a deflocculant produced by Monsanto Chemical Company) was vigorous agitation. The resultant thin slurry was dried in a hot-air dryer and the lumpy product passed through a hammer mill. A sample of the ground material was tested by the above-described test and found to be autogenously dispersible.

The remainder of the product was placed in the vessel of FIG. 1 and compacted by placing the entire vessel on a vibrating platform until the solid material occupied about 9 cu. ft. (about 70 lb. ft.$^3$). Plug cock 10 was then opened (valve 20 closed) and approximately 200 pounds of water was inserted through valve 14 using water pressure from the city main. The rate was controlled so that the water addition took about 20 minutes. The water was then turned off, and air was turned on through valve 16 at a rate of about 0.5 cfm. (The precise air rate was not critical and was estimated from the on-off cycle of the small air compressor.) At the end of an additional 10 minutes, the mass in the main vessel had been converted to a smooth mobile slurry. Valve 20 was opened and the tank emptied by the operation of pump 22. The liquid was smooth, free-flowing and free of lumps. Pumping was entirely without incident. A test of the solids content of the liquid showed a solids content w/w of 73 %, indicating that slightly more than the desired 200 pounds of water had been used.

FIG. 2 illustrates the modified freight car suitable for the operation of the present invention. The car is provided with quick-connect fittings 30 and 32 for the suction and recycle of pump 46. Air manifold 38 is provided with connections 34 and 36. In the preferred embodiment shown, the described manifold is positioned beneath the center line of fittings 30 and 32 and in line with them. In operation, valve 40 is connected to the quick connecting fitting most convenient. On the opposite side of the car a similar valve 48 is connected if a pump recycle line is to be used. A suitably valved airline is connected to either 34 or 36, the flow of water is then initiated through water meter 44 at a suitably controlled rate, e.g., initially at a low rate and later at rates up to about 25 gpm. If desired, the water meter may be provided with an automatic cutoff, set to cut off the flow of water when the weight of water delivered equals about 35–50% of the dry weight of barium carbonate material contained in the hopper of the car. At this point, if desired, the air flow may be started. The amount of compressed air normally required is small, on the order of about 0.15 cu. ft. per minute per cu. ft. of tank or bin capacity. While the water is being added, pump suction line 50, and, if desired, recycle line 48 may be connected; valve 40, however, is maintained in the closed position. When the mass in the car is thoroughly fluid, valve 40 is opened and the pumpout operation is started. Any desired rate of pumping is suitable. However, the pumping rate may be controlled if desired by diverting any amount of the pumped slurry through the recycle line. As noted previously, the positive displacement type of pump such as the so-called Moyno pump produced by the Robbins and Meyers Company exemplifies a suitable type of pump, but any type of pump suitable for extremely heavy duty may be used. In selecting a pump, it is necessary to take into consideration that the slurry solids content may vary up to about 75–80% with a slurry weight as high as 25 lbs. per gallon.

EXAMPLE II

One compartment of a railroad car of the type shown in FIG. 2 was loaded substantially to maximum capacity with 60,000 lbs. of autogenously dispersible barium carbonate composition prepared by deflocculating the equivalent amount of barium carbonate with 0.2% dry weight of a 40% water solution of Dequest 2006 and spray drying the resulting dispersion. The bulk density of the dried product, as loaded, was 75 lbs. per cu. ft. After about 10 miles rail transport, the material had packed to a density of about 90 lbs. ft.$^3$.

The car was then connected as shown in FIG. 2, and 3830 gallons of water was added through water meter 44 and inlet 30, at a gradually increasing rate over a period of 6½ hours. Compressed air at a rate of about 100 cfm. was turned on through the manifold 38 and left on overnight (16 hrs.). At the end of this time, visual examination and probing with a rod showed that suspension of the solids was complete. The discharge pump was activated and pump-out was accomplished without incident at a rate of about 300 gpm in about 15 minutes.

The material prepared in this manner does not have the non-settling characteristics described in U.S. Pat. No. 3,322,683, since no colloidal protectant can be added to the carbonate before the addition of water when this invention is practiced. Even the slightest trace of such material tends to completely block the ready absorption of water on which this invention depends for its success. Furthermore, the invention does not depend on small particle size, but is operable with even relatively large crystals. When such crystals are so suspended in a deflocculated condition, settling rates are abnormally fast and it is essential that appropriate precautions be taken. For example, either care must be taken that pump lines be so arranged as to drain clean or they must be thoroughly flushed immediately after use before settling and blockage can occur.

While the use of coarse crystalline materials is envisioned in this product and process, finer crystalline materials settle less rapidly in extended after storage and may be preferred where such extended after storage is required.

Likewise, it must be understood that the operation of this invention is in no wise hampered by the addition of thickening agents or protective materials after the pumpable slurry is formed.

It is important in the operation of the present invention that the addition of water is carried out in such a manner that no substantial volumes of dry material be surrounded at any time during the operation. When this happens, the air in the surrounding portions cannot be eliminated therefrom by the simple mechanism of wetting, being, in effect, trapped by a surrounding wetted layer. For this reason, while I prefer to add the water to the bottom of the vessel at a controlled rate, other methods of accomplishing the same end might be used; for example, the water might be added at a side, through a permeable central well, or the like. Even in the most firmly packed material, the capillary volume of the mass is entirely adequate for rapid removal of air if the proper conditions of ultra-hydrophilic wetting obtain. For example, if it were possible to pack barium carbonate to a bulk density of 185 lbs. per cu. ft., the resultant mass would still contain capillary air passages to the extent of in excess of 25% of the volume.

While simple injection is preferred as a method of introducing the air, in certain cases, particularly where long after storage of the slurry is required, either in the transporting vessel or in a separate storage vessel, it may be desirable to install draft tubes which may function as air lifts to secure bottom-to-top turnover and counteract settling more efficiently than would be the case with a simple stream of gas bubbles.

It was originally believed that ordinary solid barium carbonate might be loaded into a freight car of the type shown in FIG. 2 and unloaded in the manner described in Example II. It was found, however, that approximately two to three cubic volumes of water must be employed for each cubic volume of barium carbonate. As a result, it would be necessary to transport the bulk car two-thirds empty if a slurry of 33% solids was to be made up from the undeflocculated barium carbonate. Even at this low solids content, however, the undeflocculated barium carbonate slurry is excessively thick and difficult to pump. As an alternative, it is considered that the car might be loaded in the usual manner with the undeflocculated barium carbonate and the material sluiced at the point where the product was needed. The following example illustrates attempts to employ sluicing techniques.

EXAMPLE III

Six hundred pounds of the regular production, barium carbonate filter cake of the type described in Example I was dried. A sample was treated in accordance with the empirical test previously defined. When 8.5 grams of water had been added to the sample, only a portion of the sample was dampened although absorption was fairly rapid. When approximately 25 grams of water had been added, a thick mud was formed. Additional water was not absorbed without stirring. When the mass was stirred with a spatula, it became fluid at about 40% solids and was a pumpable fluid at about 30% solids.

The balance of the dried material was packed in the apparatus of FIG. 1. When water was added to the vessel through the bottom valve, the upper surface of the solids raised almost immediately. Attempts to pump out any fluid resulted immediately in clogging the suction of the pump. Every attempt was made to pump this out through the bottom and some slight success was gained by using a water pipe as a lance through the top of the mass. However, pumping was very erratic and the suspension at the pump inlet varied from almost clear water to high enough solids to clog the pump suction firmly.

It was thought possible that if the solid barium carbonate had simply admixed with it, air agitation of the mass of the preferred embodiment containing the ultrahydrophilic deflocculant might produce adequate deflocculation. The following example illustrates this procedure. Six hundred pounds of the dried barium carbonate of Example III containing 1.8 pounds of Dequest 2006 admixed with it was placed in the apparatus of FIG. 1 and approximately 200 pounds of water added through the bottom valve at such a rate that the carbonate did not noticeably rise in the vessel, i.e., the water was absorbed as added. This took about 60 minutes. At the end of this time, the mass appeared wet but not fluid. Air was turned on at a rate of about 1.5 cfm. After some time, the air apparently established a path along which reasonably adequate deflocculation had occurred and then the air followed this more fluid path exclusively. An additional 50 pounds of water was added and the air was opened to the maximum rate of the compressor (3.5 cfm). This produced fairly violent agitation and brought the entire mass to a pumpable condition in about 30 minutes. Pump-out was without incident, but it was noteworthy that the product coming from the pump was far lower in viscosity (i.e., more highly deflocculated) than the material in the tank. Such operation is considered marginally practicable.

Additionally, attempts have been made to follow the procedures of Example III, but including deflocculant dissolved in the water set into the storage container. This procedure, however, was met with failure. The water-deflocculating stream followed paths of the least resistance forming channels through the mass which were preferentially followed by the liquid. As a result, thorough wetting of the mass was never obtained.

The following examples compare the autogeneously dispersible mixture of the present invention with a simple mixture of barium or strontium carbonate and dispersant.

EXAMPLE IV

Twenty-five pounds of dry barium carbonate was mixed in a tumbling drum mixer with 0.05 pounds of Calgon, a commercial glassy sodium hexametaphosphate. Mixing was continued for 3 hours to secure a thorough and uniform admixture. At the end of this time three samples, taken from various places in the drum, were made up to 75% solid with a malted milk mixer. All showed a viscosity in the range of 50–60 centipoises, a value considered normal for this 0.2% deflocculant content.

Eleven pounds of this mixture was placed in a vertical four inch glass pipe and 7.3 pounds of water was added through the bottom at such a rate as to be absorbed by upward displacement of the air. There was some tendency to establish preferred channels which might have isolated unwetted masses but the tendency was counteracted by slowing the addition of the water. Water addition was complete in 45 minutes. Air agitation was started and continued for one hour. A test showed that at the end of his time (in spite of the fact that the charge appeared fluid) it would not discharge. Air agitation was continued for an additional six hours. At the end of that time, the vessel still would not discharge. On emptying it was found that the bottom 1½ inches approximately contained a leathery non-Newtonian semi-fluid which would flow very slowly, but would fracture if subjected to sudden stress.

EXAMPLE V

The remainder of the 50 lb. bag of barium carbonate which was used in the preceding example was mixed with 0.05 lb. of Calgon and 8.4 lb. of water and thoroughly deflocculated by use of a higher shear agitator for 10 minutes. It was then air dried and the lumpy material so produced was micropulverized. Calgon is not stable in the presence of water at elevated temperatures except for short periods of time such as might be accomplished in a spray drier so that for the purpose of this experiment, the mixture was dried at a low temperature. When 11 pounds of this material was placed in the test apparatus of Example IV, and 7.3 lb. of water added through the bottom, absorption of the water was rapid and complete. It could be seen that solid material was rapidly falling from the wetted bottom of the dry column into the ascending water column and rapidly dispersing therein. Addition of water was complete in 12 minutes. After 10 minutes of air agitation the fluid mass discharged completely through the bottom outlet without any apparent residue of the type previously described.

EXAMPLE VI

Examples IV and V above were repeated using strontium carbonate instead of barium carbonate. Because of the finer particle size and higher surface area of the strontium carbonate 0.4% of the deflocculant was used. Because of the lower bulk density the test vessel would only hold 8 pounds dry weight to the same fill line. 5.3 pounds of water was introduced. The material which was a simple admixture of deflocculant and strontium carbonate behaved in every respect similar to the simple admixture with the barium carbonate. Wetting tended to be irregular and water addition had to be made at a reduced rate. After extensive air agitation the material would not discharge, and the "leathery non-Newtonian semi-fluid" at the bottom of the vessel behaved in a manner similar to the barium carbonate Example. The sample which was thoroughly deflocculated before drying, as in Example V, showed the sample behavior as the analogous barium carbonate sample. Because of the lower initial bulk density, the lowered volume of the suspension was even more remarkable; however, the 60% by weight slurry occupied less than 50% of the initial volume of dry material.

EXAMPLE VII

Eleven pounds of the mixture of Example IV was placed in the vertical 4 inch glass pipe used in Example IV. When water was added to the top of this pipe, it was obvious that at this loading there was not sufficient room at the top of the pipe to accommodate sufficient water to represent 40% of the weight of the solids liquid mixture it was desired to exemplify. Such water as was added produced a wetted layer on the surface several inches thick, but even at the end of 24 hours only a few inches of water was absorbed. In the thought that the difficulty might be that the air was trapped below the wetted surface, the bottom valve was then opened. In an additional 24 hours, approximately 2 more inches of dry material was wetted. Air pressure was then applied to the bottom valve in an attempt to accomplish the wetting with agitation. The air passed through the wetted layer by the formation of a preferred passageway, and while it accomplished the dispersion of material above the wetted layer, in eight hours of air passage, the wetted layer had not moved downward. Even the attachment of a vacuum pump to the bottom of the vessel did not increase the downward travel of the liquid layer. On emptying the vessel the lower portion of the wetted layer was found to consist of a tough "leather-like" material which would flow very slowly, but which would fracture if subjected to sudden stress.

It is to be understood, therefore, that the material to be treated in accordance with the present invention is an alkaline earth metal carbonate preferably barium or strontium carbonate which has been first completely deflocculated and then dried, e.g., to a maximum water content of about 5% by weight and then ground or otherwise pulverized if necessary. The solid materials are essentially free of binders and protectants as dried and shipped or stored since these materials will preclude the removal of the material from the storage container by the methods described herein.

What is claimed is:

1. In a process wherein an alkaline earth metal carbonate is contained in a storage container and removed therefrom as an aqueous slurry, the improvement which comprises steps of
   a. storing said carbonate in the form of an autogenously dispersible carbonate composition consisting essentially of an alkaline earth metal carbonate which has been essentially completely deflocculated with an ultra-hydrophilic dispersant and the resulting dispersion dried under conditions which are non-destructive of said ultra-hydrophilic dispersant;
   b. introducing an aqueous liquid into the mass of said carbonate composition at a point in said container below the major mass of said carbonate composition;
   c. continuing said aqueous liquid introduction until the amount of said aqueous liquid is sufficient to provide a fluid slurry of said carbonate;
   d. introducing non-reactive gas under pressure into the mass of said carbonate and aqueous liquid at a point near the bottom of said storage container at the conclusion of step (c) to effect substantial homogenization of said carbonate composition and aqueous liquid to form a generally uniform slurry thereof; and
   e. removing said slurry from said storage container.

2. A process in accordance with claim 1 wherein said autogenously dispersible carbonate composition contains at least 0.08%, dry weight basis, of said ultra-hydrophilic dispersant.

3. A process in accordance with claim 1 wherein said autogenously dispersible barium carbonate composition contains from about 0.15 to 0.25%, dry weight basis, of said ultra-hydrophilic dispersant.

4. In a process wherein barium carbonate is contained in a storage container and removed therefrom as an aqueous slurry, the improvement which comprises steps of
   a. storing said barium carbonate in the form of an autogenously dispersible barium carbonate composition consisting essentially of barium carbonate which has been essentially completely deflocculated with an ultra-hydrophilic dispersant and the resulting dispersion dried under conditions which are non-destructive of said ultra-hydrophilic dispersant;
   b. introducing an aqueous liquid into the mass of said barium carbonate composition at a point in said container below the major mass of said barium carbonate composition;
   c. continuing said aqueous liquid introduction until the amount of said aqueous liquid is sufficient to provide a fluid slurry of said barium carbonate;
   d. introducing non-reactive gas under pressure into the mass of said barium carbonate and aqueous liquid at a point near the bottom of said storage container at the conclusion of step (c) to effect substantial homogenization of said barium carbonate composition and aqueous liquid to form a generally uniform slurry thereof, and
   e. removing said slurry from said storage container.

5. A process in accordance with claim 4 wherein said autogenously dispersible barium carbonate composition contains at least 0.08%, dry weight basis, of said ultra-hydrophilic dispersant.

6. A process in accordance with claim 4 wherein said autogenously dispersible barium carbonate composition contains from about 0.15% to 0.25%, dry weight basis, of said ultra-hydrophilic dispersant.

7. In a process wherein said strontium carbonate is contained in a storage container and removed therefrom as an aqueous slurry, the improvement which comprises steps of
   a. storing said strontium carbonate in the form of an autogenously dispersible strontium carbonate composition consisting essentially of strontium carbonate which has been essentially completely deflocculated with an ultra-hydrophilic dispersant and the resulting dispersion dried under conditions which are non-destructive of said ultra-hydrophilic dispersant;
b. introducing an aqueous liquid into the mass of said strontium carbonate composition at a point in said container below the major mass of said carbonate composition;
c. continuing said aqueous liquid introduction until the amount of said aqueous liquid is sufficient to provide a fluid slurry of said strontium carbonate;
d. introducing non-reactive gas under pressure into the mass of said strontium carbonate and aqueous liquid at a point near the bottom of said storage container at the conclusion of step (c) to effect substantial homogenization of said strontium carbonate composition and aqueous liquid to form a generally uniform slurry thereof, and
e. removing said slurry from said storage container.

8. A process in accordance with claim 7 wherein said autogenously dispersible strontium carbonate composition contains at least 0.08%, dry weight basis, of said ultra-hydrophilic dispersant.

9. A process in accordance with claim 7 wherein said autogenously dispersible strontium carbonate composition contains from about 0.15% to 0.25%, dry weight basis, of said ultra-hydrophilic dispersant.

* * * * *